United States Patent [19]

Hungerford

[11] 4,353,967
[45] Oct. 12, 1982

[54] MULTILAYER POLYACRYLONITRILE FILM

[75] Inventor: Gordon P. Hungerford, Palmyra, N.Y.

[73] Assignee: Mobil Oil Corporation, New York, N.Y.

[21] Appl. No.: 250,807

[22] Filed: Apr. 3, 1981

Related U.S. Application Data

[62] Division of Ser. No. 143,581, Apr. 25, 1980, Pat. No. 4,287,147.

[51] Int. Cl.³ .................... B32B 27/80; B32B 5/16
[52] U.S. Cl. .................................. 428/520; 428/327; 428/522; 264/146
[58] Field of Search ............... 428/520, 522, 911, 327; 264/146

[56] References Cited

U.S. PATENT DOCUMENTS

| | | |
|---|---|---|
| 3,182,100 | 5/1965 | Bedell. |
| 3,448,183 | 6/1969 | Chisholm. |
| 3,819,773 | 6/1974 | Pears .................................... 264/37 |
| 3,976,730 | 8/1976 | Cushing ............................... 264/37 |
| 3,993,810 | 11/1976 | Bonis ................................... 264/171 |
| 4,013,745 | 3/1977 | Brinkmann et al. .................. 264/171 |
| 4,066,731 | 1/1978 | Hungerford ......................... 264/182 |
| 4,086,045 | 4/1978 | Thiel et al. ........................... 425/404 |
| 4,165,210 | 8/1979 | Corbett ................................ 425/133.5 |

Primary Examiner—George F. Lesmes
Assistant Examiner—E. Rollins Buffalow
Attorney, Agent, or Firm—Charles A. Huggett; James F. Powers, Jr.; James P. O'Sullivan, Sr.

[57] ABSTRACT

A novel multilayer film is made by extruding and/or casting at least two layers of resin, such as polyacrylonitrile homopolymer or interpolymers. By co-extruding a continuous multilayer film with contiguous or tandem dies from a first supply of homogeneous resin solution and a second supply of non-homogeneous redissolved resin scrap, a film may be cast onto a smooth cooled drum surface to form substantially continuous adjacent layers from two or more resin supplies. Scrap resin, such as selvage trimmed from stretched film or mill scrap, is comminuted and redissolved in solvent for recycle to the second supply of the extrusion step. The homogeneous layer prevents film disruption by inhomogeneities present in the contiguous layer containing redissolved scrap, which might cause localized stresses in the film and discontinuities during stretching.

7 Claims, 5 Drawing Figures

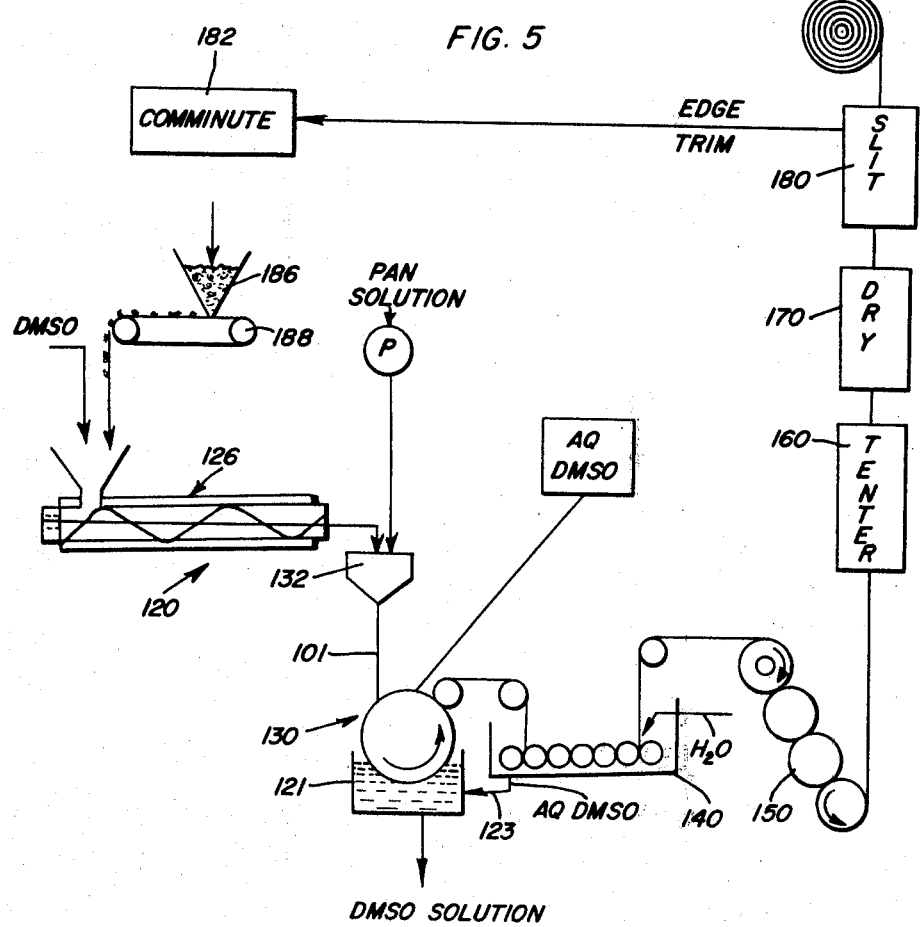

MULTILAYER POLYACRYLONITRILE FILM

REFERENCE TO COPENDING APPLICATION

This application is a division of U.S. patent application Ser. No. 143,581 filed Apr. 25, 1980 now U.S. Pat. No. 4,287,147 issued Sept. 1, 1981.

BACKGROUND OF THE INVENTION

The present invention involves a multilayer film structure utilizing selvage or scrap from polyacrylonitrile (PAN) film manufacturing operations. In processing polymeric films of various types for orientation by stretching the film, a certain amount of edge portions, ends and other film scrap is generated during the manufacturing process. In some production lines it is not unusual to have 10 to 30% or more selvage materials, which should be utilized in making valuable product if the manufacturing facility is to be economic.

Various processes have been devised for using marginal strips and waste products from extruded film. In U.S. Pat. No. 4,013,745 a typical prior art system reprocesses scrap by severing and recycling it to an extruder screw inlet, along with virgin polymer. The two materials are dissolved in a common solvent and fed in a unitary stream through a sheeting die to form a film. While such reprocessing techniques are feasible for certain products, they are not suitable for recycling PAN resin for use in high-performance films.

In forming a film sheet or foil of PAN resin, gas barrier properties and appearance are important qualities of the product dependent upon uniformity of composition. Where only virgin PAN resin is employed with pure solvent in constituting the extrusion mass, homogeneous solutions can be obtained without undue processing. PAN resins may be synthesized in the solvent and used without being recovered as discrete solid particles. Also, finely divided powders of acrylonitrile homopolymers and interpolymers are relatively easy to dissolve completely, due to their small particle size, usually 1 to 15 microns. When recycling scrap or selvage resin, however, it is difficult to obtain such fine subdivision by ordinary chopping, grinding or other comminution processes. Recycled resin solids may have a size and shape which render the material difficult to handle and present problems in solvent penetration during dissolution. Even with the use of auxiliary equipment, such as homogenizers, filters, etc., it is impractical to obtain completely homogeneous solutions of the recycle resin suitable for mixing with the virgin PAN feedstock. Verysmall amounts of undissolved resin can provide heterogeneities and film discontinuities when cast as a single layer, especially when casting a thin film. Localized stresses due to such imperfections may result in uneven stretching, pinholes or tears in the film, which are unacceptable for gas barrier service and affect appearance adversely.

SUMMARY OF THE INVENTION

It is an object of the present invention to provide a multilayer film comprising polyacrylontrile or the like formed of contiguous layers of non-homogeneous and homogeneous resin materials having good film integrity. A system is provided for extending at least two streams of resinous material as discrete layers. This may be achieved by multiple die means which extrude the resins in laminar flow relationship. The extruded resin, usually in hot concentrated solution form, is solidified to form a film, as by cooling and coagulation. The film is oriented by stretching and dried to remove volatile matter. Cutting means removes the edge trim and produces a finished film product. Resin scrap is recycled by comminuting and dissolving the resin to form a non-homogeneous material for re-extrusion as a discrete layer.

BRIEF DESCRIPTION OF THE DRAWING

FIG. 4 is a cross-sectional view of an alternative film segment having a layer of recycled PAN, virgin PAN and thermoplastic heat seal layer; and FIG. 5 is a schematic drawing of a preferred process for casting polyacrylonitrile film with organic solvent and aqueous washing media.

DESCRIPTION OF THE PREFERRED EMBODIMENTS

In the following description, metric units and parts by weight are used unless otherwise stated.

Figure 1:
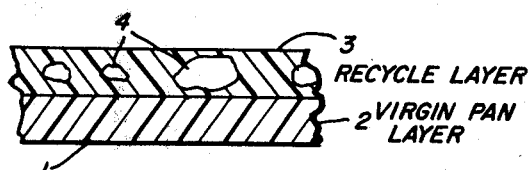
FIG. 1 is a cross-sectional view of a film segment.

Referring to the drawing, in FIG. 1 is shown a typical multilayer film 1 including a layer 2 of homogeneous resin and a contiguous layer 3 of non-homogeneous resin, containing small particles 4 of undissolved material.

Figure 2:
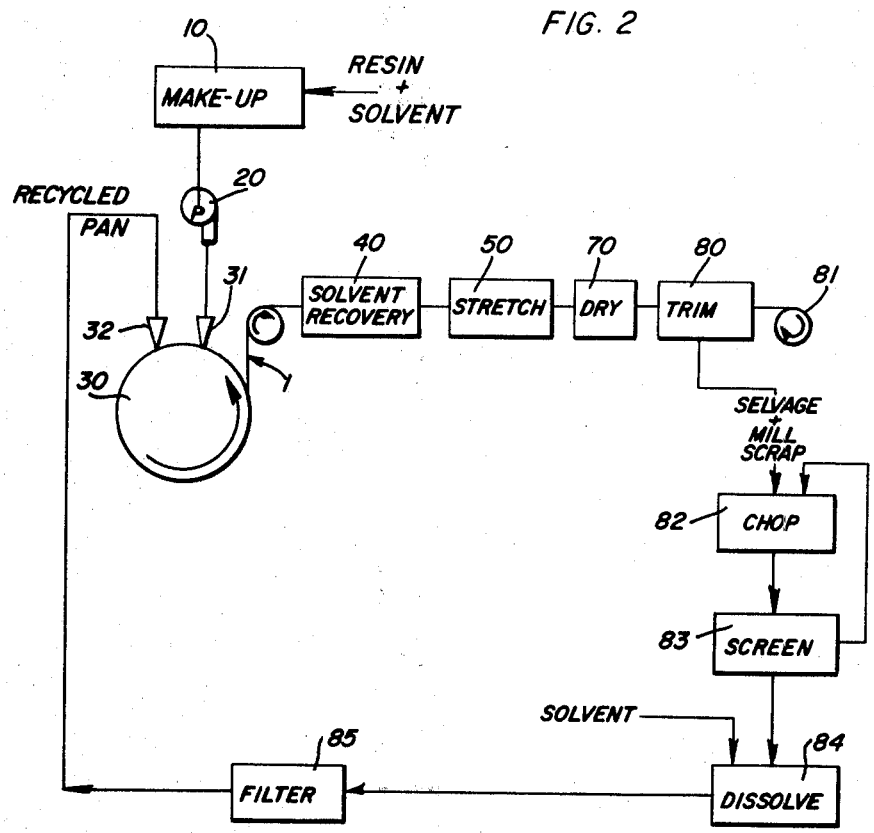
FIG. 2 is a schematic diagram of a typical system for solvent casting of multilayer film.

This film can be manufactured by employing the casting and scrap recovery system shown in FIG. 2. The initial hot solution of resin and solvent is mixed and homogenized in makeup station 10 and passed through pump means 20 to casting drum 30 via first sheeting die 31, which lays down a solidified layer of virgin resin. Casting drum 30 is maintained sufficiently cool to solidify the resin, forming a uniform layer. A second layer is cast from tandem sheeting die 32, spaced from the first die 31. The coagulated film 1 is stripped from drum 30 as a self-supporting continuous multilayer film strip. Thereafter, the multilayer film is passed through a series of operatively connected processing units, which include solvent removal means 40, stretching means 50 to provide an oriented structure, drying means 70 to remove volatile components of the cast film, trimming means 80 for removing excess resin from the marginal portions of the stretched film as selvage, and winding means 81 for product film. The trimmed selvage and other mill scrap is then chopped and/or ground in suitable comminuting means 82 and fed to screening unit 83 or other suitable means for separating large scrap particles for further size reduction. The smaller particles, having a suitable size for subsequent handling, are admixed with hot solvent in dissolver unit 84 and passed through filter means 85 to retain over-sized particles suspended in the non-homogeneous resin solution. The hot scrap solution is then recycled to the second sheeting die 32.

While the manufacturing system can be adapted to handle a wide variety of scrap materials from various points in a film production plant, a main source of recycled material is the selvage obtained from edge trimming operations and slitting scrap. This is usually in the form of a thin sheet material, having thickness of 0.5 to 2 mils (12–50 microns), typically. By chopping, severing or otherwise cutting the film, thin flakelike particles can be obtained having a relatively small thickness dimension, but rather large planar dimensions of several millimeters may be produced. This system is well adapted for redissolving these flake film particles by admixing the comminuted material with hot solvent. Although the non-homogeneous resin supply can be more dilute than the homogeneous supply, it is desirable to optimize the process with the least amount of solvent that will produce satisfactory multilayer film. Hot DMSO solvent with PAN homopolymer scrap can be successfully recycled with only 15 to 30 wt % resin. If greater quantities of solvent are required, solvent removal before extrusion may be required to assure film integrity. The dissolution step may be performed by high-shear equipment or the like to disperse and dissolve the scrap resin. Large solids may be further dispersed with compression-type equipment or "homogenizers" to provide a non-plugging stream of recycled resin. A screen-type filter can be employed to retain oversized particles that might be larger than the film extrusion thickness.

Certain types of extruders can handle initially-larger recycled particles and still produce satisfactory extrudate. In some screw-type equipment, dry recycled resin can be compressed as a low bulk feedstock and redissolved with hot solvent as it advances along the path of the screw means.

The relative thickness of layers may be fixed or varied according to available scrap resin being generated and reprocessed. Where the virgin PAN supply is unlimited, the continuous production rate for single-resin film can be met for a wide range of scrap content from none to the upper limit of film integrity. About 5 to 25 microns (0.2 to 1 mil) gives satisfactory performance for the individual layers of typical film used in wrapping food or other articles. Total finished PAN film thickness of about 10 to 20 microns forms a good gas barrier for oxygen and water vapor.

Figure 3:
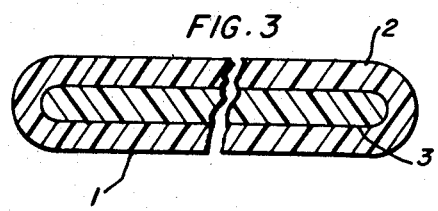
FIG. 3 is a cross-sectional view of a film segment having virgin resin, recycled resin and a thermoplastic layer.

It is possible to extrude the PAN homopolymer on both sides and at each edge of a multilayer film, as shown in FIG. 3. The inner core layer 3 may comprise the non-homogeneous selvage extrusion composition. A system for co-extruding triple-layer film with beaded edges is disclosed in U.S. Pat. No. 3,448,183. The edge bead facilitates stretching the film by tentering and can be trimmed from the product following orientation. It may be feasible to employ selvage as the outer layer in some circumstances, with homogeneous PAN solution being injected as the core layer.

Polyacrylonitrile polymers containing very large amounts of homopolymeric units do not melt at practical heat-sealing temperatures. The homopolymer can be cast or extruded by solution techniques; but, once coagulated, the resulting articles cannot be fused effectively by heat alone. When it is desired to impart heat sealing properties to PAN film, this may be accomplished by introducing a suitable comonomer with acrylonitrile; such as an interpolymer of $C_4$-$C_8$ alkylacrylate and/or other thermoplastic component with acrylontrile. Unfortunately, significant amounts of such comonomers as butylacrylate degrade the gas barrier characteristics of polyacrylonitrile. However, it may be desirable to incorporate 10–20% alkylacrylate in at least one layer of the film.

In one aspect of the invention shown in FIG. 4, an adhering thermoplastic layer 5 is co-extruded with the virgin PAN layer 2 and recycled PAN layer 3 to obtain a multilayer orientable film having heat sealing properties. Advantageously, this is achieved by a three-orifice die by feeding homogeneous PAN solution to an outer orifice, recycled non-homogeneous PAN selvage solution to a middle orifice, and a compatible thermoplastic material to the other outer orifice. This results in a three-layer film having its weaker inside layer protected by the outer layers during stretching.

The present invention also provides manufacture of multilayer film from selvage or scrap containing at least one substantially non-thermoplastic polyacrylonitrile component. For instance, if the product film has one layer of PAN homopolymer to provide low oxygen and water vapor permeability and a thermoplastic coextruded heat seal layer of 20% butylacrylate—80% acrylonitrile copolymer, the selvage can be ground and redissolved in DMSO or suitable cosolvent to provide the non-homogeneous layer. Numerous variations in materials can be included in the film within the inventive concept.

In a preferred embodiment of the invention, the multilayer film is extruded from an extrusion die having a plurality of manifolds for supplying the different resinous streams to a common flow passage from which the film-forming material is extruded at elevated temperature onto an adjacent cold casting roll. Flow control means is provided for feeding the individual resinous streams continuously at predetermined uniform rates, which establish the relative thicknesses of the discrete layers. At flow rates at which laminar flow prevails, fluid streams combine without substantial intermixing between layers and give a uniform film. Suitable multilayer extrusion die assemblies are disclosed in U.S. Pat. Nos. 3,559,239 and 4,165,210, incorporated herein by reference. The layers may be formed sequentially by tandem die means wherein the layers are extruded individually onto a moving surface, one being cast onto a cold roll and one or more subsequent layers being cast over the initial layer.

In addition to casting of planar films onto drums or the like, multilayer tubular films may be formed with concentric orifices. For instance, in U.S. Pat. No. 4,144,299, PAN film is produced by extruding an organic solution into an aqueous coagulation bath while water is introduced into and withdrawn from the inside of the extruded tube. By appropriate modification of the orifice to provide two or more concentric layers, scrap may be utilized in making tubular film.

While the invention concept may be employed in ordinary solvent-plasticized film stretching operations, in recent years an improved aqueous washing system has been developed which gives high quality PAN film. The details of this system are disclosed in U.S. Pat. No. 4,066,731, incorporated herein by reference. This system, as adapted for use herein, is shown in FIG. 5. The homogeneous solution of PAN in dimethyl sulfoxide (DMSO) is introduced as a hot casting dope containing 30 to 40% PAN through a pump to multiple sheeting die 132, where it is co-extruded as a multilayer film onto the cold casting drum 130, wetted with an aqueous solution of DMSO. The solidified film 101 is then contacted with an aqueous solution of DMSO 123 which is passed countercurrently through a wash tank 140. The film is stripped from the drum continuously and proceeds through the wash tank 140 wherein the DMSO migrates out of the film and is replaced by water in the interstices of the film. By stretching the wet film longitudinally in the machine direction in heated differential roll means 150, the film is axially oriented. This is followed by transverse hot stretching in steam or water vapor environment in tenter section 160. Thereafter, the film is dried under constraint by radiant and/or convection means in drier section 170. The marginal areas are cut from the product in slitting line 180, with edge trim being recycled to comminuter 182 and fed through hopper 186 and conveyor 188 to screw-type extruder 126. The weighed scrap, now in a flaked film state is admixed with a metered amount of hot DMSO, which may be introduced at various points along the compression path of the extruder. Since the scrap PAN is a low bulk material, it is sometimes desirable to introduce at least part of the DMSO toward the feed section of the extruder 126, from which the mixture is fed to multiple sheeting die 132 for coextrusion with the virgin PAN solution.

Operating temperatures for the redissolution step with DMSO are generally maintained elevated in the range of about 110° to 175° C., preferably at about 150° C. The amount of solvent required will depend upon the scrap composition and solubility parameters of the solvents. Rather large amounts of solvent must be employed to obtain complete dissolution of the polymer, requiring an expensive evaporation step to concentrate the resin to 30–40%. It is a significant advantage of the present invention that complete solution of the resin is not required, resulting in small inhomogeneities. At the point of extrusion, the largest undissolved particles for most film applications would be about 25 microns or less, depending upon the extrusion equipment and film dimensions. In addition to DMSO, various organic solvents or co-solvent mixtures, such as dimethyl formamide, tetramethylene sulfone or other compatible solvents may be employed. Water miscibility is desirable where the aqueous washing step is employed between the casting and orienting steps. The solvent may be recovered from the various processing units and separated for reuse.

While the invention has been disclosed by particular examples, there is no intent to limit the inventive concept except as set forth in the following claims.

I claim:

1. A multilayer oriented polyacrylonitrile film comprising a first layer of substantially homogeneous polyacrylonitrile homopolymer resin in contact with a second non-homogeneous polyacrylonitrile layer containing undissolved polyacrylonitrile resin particles.

2. The film of claim 1 wherein said non-homogeneous layer consists essentially of acrylonitrile homopolymer.

3. A three-layer film according to claim 1 consisting essentially of a non-homogeneous core and continuous, homogeneous homopolymer outer layers.

4. The film of claim 1 comprising at least one coextruded layer of thermoplastic resin.

5. A multilayer film comprising contiguous layers of non-homogeneous and homogeneous polyacrylonitrile resin made with at least one layer containing recycled polyacrylonitrile by co-extruding a continuous multilayer film from a first supply of substantially homogeneous polyacrylonitrile resin solution and a second supply containing non-homogeneous redissolved polyacrylonitrile resin scrap; casting said multilayer film onto a smooth cooled drum surface to form substantially continuous adjacent layers from said first supply and said second supply; stripping said multilayer film from said drum as a self-supporting continuous film strip; removing at least a portion of the solvent from said multilayer film; stretching said multilayer film to provide an oriented structure; trimming excess polyacrylonitrile resin from said stretched film as selvage resin; comminuting said selvage resin; and redissolving said comminuted selvage resin in solvent for recycle to said second supply.

6. The film of claim 5, wherein said first supply comprises a dimethyl sulfoxide solution of acrylonitrile homopolymer.

7. The film of claim 5 wherein said multilayer film consists essentially of polyacrylonitrile.

* * * * *